(12) United States Patent
Ball et al.

(10) Patent No.: US 9,266,603 B2
(45) Date of Patent: Feb. 23, 2016

(54) SINGLE-PIECE PROPELLER AND METHOD OF MAKING

(75) Inventors: Danny Ball, Oxford, KS (US); Kevin Pfeiffer, Wichita, KS (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 1062 days.

(21) Appl. No.: 13/484,007

(22) Filed: May 30, 2012

(65) Prior Publication Data

US 2012/0279641 A1 Nov. 8, 2012

Related U.S. Application Data

(63) Continuation of application No. 12/039,458, filed on Feb. 28, 2008, now Pat. No. 8,221,084.

(51) Int. Cl.

| | |
|---|---|
| *B29C 45/02* | (2006.01) |
| *B29C 65/52* | (2006.01) |
| *B64C 11/26* | (2006.01) |
| *B64C 11/00* | (2006.01) |
| *B64C 11/02* | (2006.01) |
| *B64C 11/04* | (2006.01) |
| *B64C 11/20* | (2006.01) |
| *B32B 37/00* | (2006.01) |

(Continued)

(52) U.S. Cl.
CPC . *B64C 11/26* (2013.01); *B32B 9/00* (2013.01); *B32B 27/00* (2013.01); *B32B 27/38* (2013.01); *B32B 37/00* (2013.01); *B32B 37/02* (2013.01); *B32B 37/18* (2013.01); *B64C 11/00* (2013.01); *B64C 11/02* (2013.01); *B64C 11/04* (2013.01); *B64C 11/20* (2013.01); *B64C 2201/00* (2013.01); *Y10T 29/49332* (2015.01); *Y10T 156/1057* (2015.01); *Y10T 156/1089* (2015.01)

(58) Field of Classification Search
CPC .... B64C 11/26; B64C 11/00; B64C 2201/00; B64C 11/02; B64C 11/04; B64C 11/20; Y10T 156/1057; Y10T 156/1089; Y10T 29/49332; B32B 37/00; B32B 27/00; B32B 27/38; B32B 9/00; B32B 37/02; B32B 37/18
USPC ................................. 156/242, 245, 253, 297
See application file for complete search history.

(56) References Cited

U.S. PATENT DOCUMENTS

| | | | |
|---|---|---|---|
| 1,447,994 | A | 3/1923 | Lochman |
| 1,763,218 | A | 6/1930 | Caldwell |

(Continued)

FOREIGN PATENT DOCUMENTS

| | | |
|---|---|---|
| GB | 117202 A | 7/1918 |
| GB | 133088 A | 10/1918 |

OTHER PUBLICATIONS

PCT/US2009/035525 International Search Report & Written Opinion mailed Oct. 13, 2009, 10 pages.

(Continued)

*Primary Examiner* — Philip Tucker
*Assistant Examiner* — Vicki Wu
(74) *Attorney, Agent, or Firm* — Lathrop & Gage LLP

(57) ABSTRACT

A method for making a propeller product is disclosed. The propeller is formed using polyurethane cores adhered to a laminate hub to form a core assembly. An encapsulating structural laminate skin is then formed on the core assembly using a resin-transfer-molding process to create a single-piece composite propeller.

13 Claims, 2 Drawing Sheets

(51) Int. Cl.
*B32B 27/00* (2006.01)
*B32B 27/38* (2006.01)
*B32B 9/00* (2006.01)
*B32B 37/02* (2006.01)
*B32B 37/18* (2006.01)

(56) References Cited

U.S. PATENT DOCUMENTS

| | | | |
|---|---|---|---|
| 1,875,597 A | | 9/1932 | Spencer |
| 2,599,718 A | | 6/1952 | Munk |
| 3,310,116 A | * | 3/1967 | Shogo Saeki et al. .... 416/229 R |
| 4,268,571 A | | 5/1981 | McCarthy |
| 4,302,155 A | | 11/1981 | Grimes et al. |
| 4,407,635 A | | 10/1983 | Grimes et al. |
| 4,639,284 A | | 1/1987 | Mouille et al. |
| 4,930,983 A | | 6/1990 | Byrnes et al. |
| 5,042,968 A | | 8/1991 | Fecto |
| 5,127,802 A | | 7/1992 | Carlson et al. |
| 5,145,320 A | * | 9/1992 | Blake et al. .................... 416/230 |
| 5,173,227 A | | 12/1992 | Ewen et al. |
| 5,222,297 A | * | 6/1993 | Graff et al. ................. 29/889.71 |
| 5,269,658 A | | 12/1993 | Carlson et al. |
| 5,375,324 A | * | 12/1994 | Wallace et al. ............ 29/889.21 |
| 5,791,595 A | * | 8/1998 | Jamieson ........................ 244/65 |
| 6,106,232 A | * | 8/2000 | Wagner ........................ 416/202 |
| 7,165,945 B2 | | 1/2007 | Kovalsky et al. |

OTHER PUBLICATIONS

Select file history from related U.S. Appl. No. 12/039,458, dated Jun. 9, 2011 through May 25, 2012, 65 pages.

European Patent Application 09716053.5 Search Report dated Feb. 10, 2014, 9 pages.

European Patent Application 09716053.5 Action dated Sep. 4, 2014, 5 pages.

European Patent Application 09716053.5 Response to Communication Pursuant to 94(3) dated Nov. 14, 2014, 7 pages.

* cited by examiner

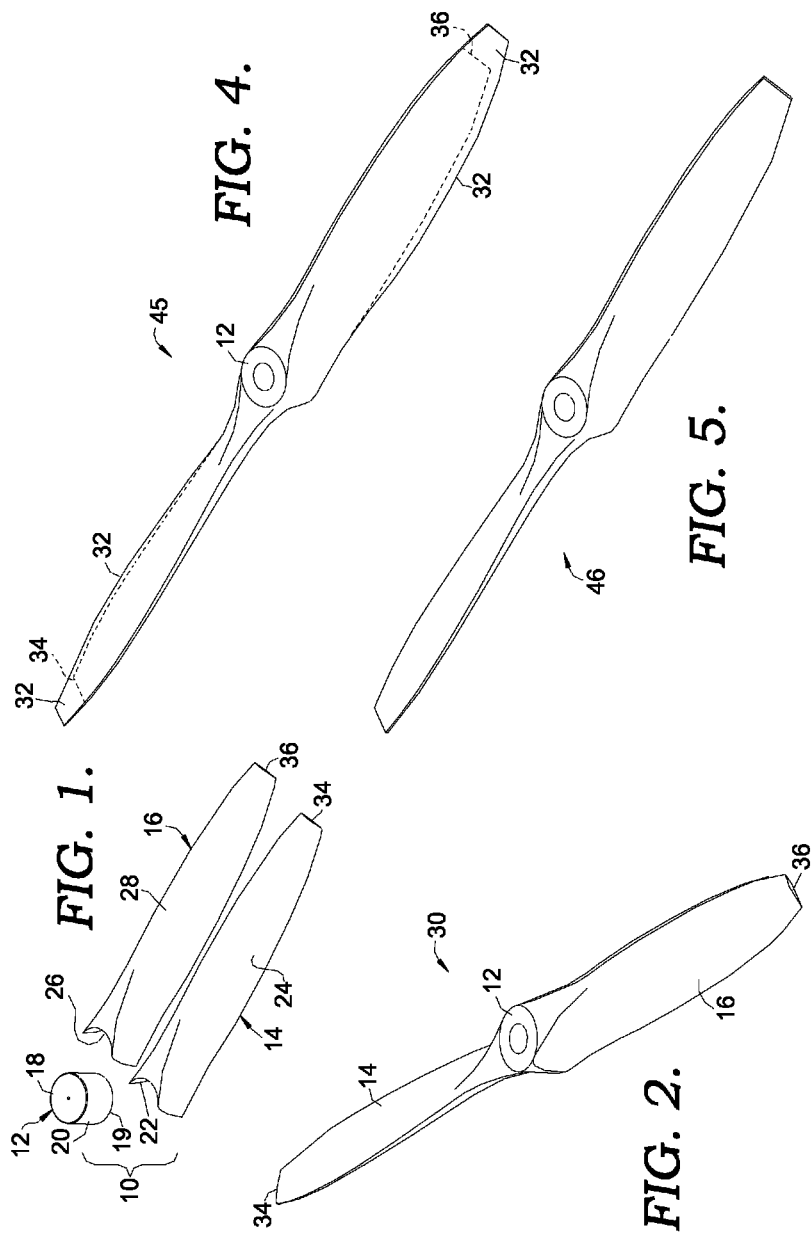

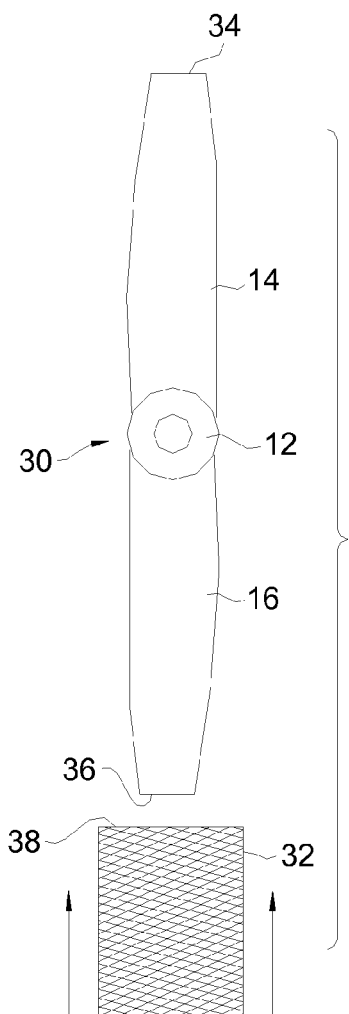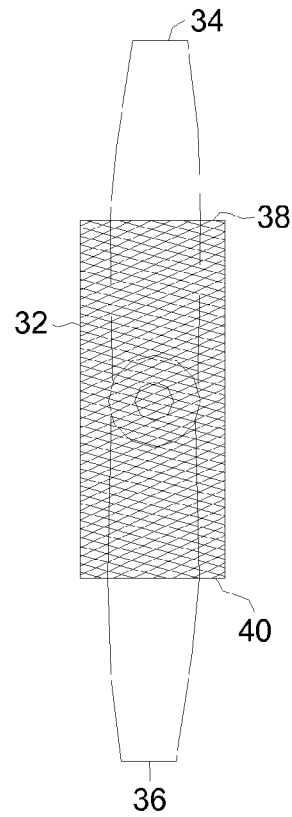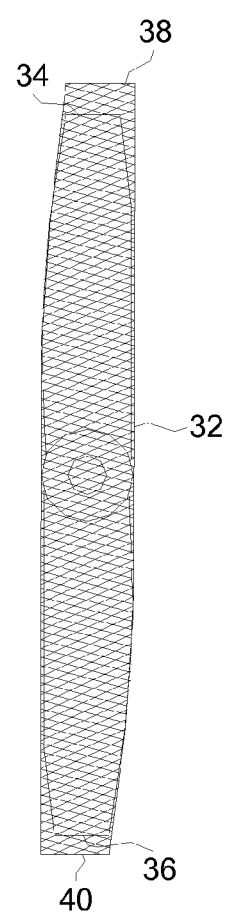
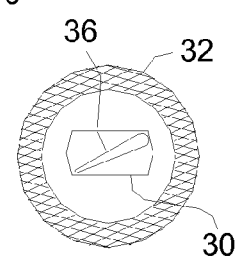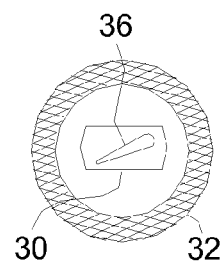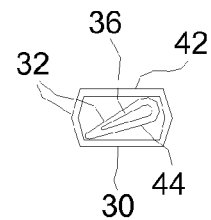
FIG. 3A. FIG. 3B. FIG. 3C.
FIG. 3D. FIG. 3E. FIG. 3F.

SINGLE-PIECE PROPELLER AND METHOD OF MAKING

CROSS-REFERENCE TO RELATED APPLICATIONS

This application is a continuation of U.S. patent application Ser. No. 12/039,458, filed Feb. 28, 2008 now U.S. Pat. No. 8,221,084, the disclosure of which is incorporated herein by reference.

BACKGROUND OF THE INVENTION

1. Field of the Invention

The disclosed embodiments relate generally to the field of aeronautics. More specifically, the invention relates to the technologies of propeller manufacture and design.

2. Description of the Related Art

Propellers transmit power by converting rotational motion into thrust. This thrust is used to propel a vehicle, e.g., an aircraft, ship, or submarine through a fluid. Some propellers have a fixed pitch—in other words, the angle of the blades do not change as the aircraft is in operation. Other propellers blades change angle to accommodate different operating speeds of the aircraft. These are known as variable-pitch blades.

One conventional design for a fixed-pitch propeller is made of a solid, single piece of Aluminum. For this kind of blade, the entire apparatus is produced as an integral piece of material. Another fixed-pitch design is constructed of a single piece of laminated wood which is bolted onto the rotation drive on the plane. With the wooden version, the propeller is generally secured using a crush plate. The crush plate is bolted against the hub portion of the propeller to distribute loads created by the attachment bolts. Yet another conventional single-piece propeller is comprised of composite materials. This design uses a wet lay-up process using solid carbon fiber cores. The solid carbon fiber cores are relatively heavy, but are necessary to carry the structural loads during propeller operation, because the composites skins alone are incapable of doing so. Other propeller designs use separate propeller blades which are retained by more complex retention mechanisms.

SUMMARY

The present invention is defined by the claims below. Embodiments of the disclosed methods and propeller manufactured include creating a propeller having an internal structure formed of a foam core and a structural skin laminate deposed outside the core. In embodiments, the skin laminate substantially encapsulates a hub portion along with at least one blade portion. This makes the structural skin laminate substantially continuous where the blade and hub interface.

In embodiments, the core comprises an assembly of at least two blade components affixed to a hub component. In yet other embodiments, these hub and blade components are all constructed of the same material, but in the disclosed embodiment, the hub is constructed of a more crush-resistant laminate material, whereas the blade portions are made of polyurethane foam. In embodiments, the structural skin is formed using a sleeve made of fibrous braid material as part of a resin-transfer-molding (RTM) process.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 shows the hub and blade cores which will later be assembled to comprise a core for the propeller;

FIG. 2 shows the cores assembled and prepared to be covered with a structural skin of braid and cloth materials;

FIG. 3 shows the steps involved in laying up the propeller;

FIG. 4 shows the assembled cores covered with a structural braid; and

FIG. 5 shows the final propeller product after the RTM process has been completed.

DETAILED DESCRIPTION

Embodiments of the present disclosures provide a fixed-pitch propeller and method of manufacturing the same.

Because the disclosed single-piece propeller is manufactured using lightweight foam cores and is constructed of extremely strong and durable composite materials, its weight is roughly half that of the conventional Aluminum single-piece propellers now used. Further, the single-piece end product is easily bolted onto the front drive mechanisms of the aircraft using a crush plate. Finally, because it is of seamless composite construction, the propeller is largely maintenance and labor free.

The single-piece blade, in one embodiment, is manufactured according to the following process. First, the core components are provided. These components, as they appear before assembly, can be seen in FIG. 1. Referring to the figure, it can be seen that a grouping of parts 10 includes a hub core 12, a first blade core half 14, and a second blade core half 16.

Hub core 12, in some embodiments, is comprised of pre-cured composite laminate, e.g., phenolic or G-10 materials. In other embodiments, hub 12 could be formed of heavy polyurethane foam capable of taking normal clamping and crush loads. Alternatively, it might be constructed of a machined piece of metal or some other material. The use of composite laminate or metal provides extra margin for error due to abnormal loads, e.g., bolt over-tightening. Regardless, the hub core will be adapted to handle bolt crush loads for when the crush plate is installed to secure the blade. Alternatively, it is possible that the objectives of the invention could be accomplished without using a crush plate. In the preferred embodiment, however, a crush plate is used.

Referring to FIG. 1, the hub core 12 has a substantially cylindrical side surface 20, a forward face 18, and a back face 19. Although hub 12 is shown to be substantially cylindrical in the figures, it should be understood that other shapes would be advantageous in different situations. For example, some crush plates apply bolts at positions within a substantially diamond-shaped area using the tip areas to install metallic wools for dynamic balancing purposes. In such cases, it would make sense to configure hub 12 into a diamond shape to accommodate the bolt pattern. For other applications, other shapes would be used. Thus, the scope of possibilities is not limited to any particular shape.

It is also possible that ears (not shown) could exist on hub 20 which correspond with receiving areas on the blade portions 14 and 16. These ears would be used to help the user properly align the blade portions on the hub relative to one another.

Blade core halves 14 and 16, in the disclosed embodiment are made of polyurethane foam. More specifically, the blade cores are constructed of commercially available polyurethane materials. Alternatively, different sorts of cores such as polyester foam, end-grain balsa, cross-linked polyvinyl chloride (PVC), polymethacrylimide (PMI), polyester, polyisocyanurate, linear PVC, or other materials could be used.

First blade core half 14 includes a cylindrical removed inner portion 22 which is adapted to receive and be mated with a location on the cylindrical outside surface 20 of the hub 12. Blade core half 14 also has an airfoil portion 24. Similarly, second blade core half 16 has a cylindrical removed inner portion 26 which is adapted to be mated with an opposite location on the cylindrical outside surface 20 of the hub 12. It should be understood that for embodiments having noncylindrical shapes (e.g., diamond-shaped), the inner portions (e.g., portions 22 and 26) would be shaped to mate with the outside surfaces of that particular hub design. Like half 14, blade core half 16 also includes an airfoil-shaped portion 28.

The foam cores 14 and 16, and hub 12 together will be adhered to one another (as shown in FIG. 2) to support the inside of the composite structure and to simplify the lay-up process. In the preferred embodiment, inner portions 22 and 26 are adhered to the opposite locations on the outside surface 20 of hub 12 using an adhesive. One adhesive which could be used for this purpose is readily available Hysol EA9309 aerospace adhesive, which is well known to those skilled in the art.

Referring to the core assembly 30 shown in FIG. 2, it can be seen that blades 14 and 16 are adhered such that they are opposite one another.

Once the adhesive has cured, the cores are ready to be covered with a structural braid material 32 formed into a sleeve as shown in FIGS. 3A-F. Referring first to FIG. 3A, core assembly 30 receives the braid material 32 over one of a blade tip 34 or a blade tip 36 (FIG. 3A shows the braid sleeve received over tip 36 and then blade core 16) and is then slid midway down the blade as shown in FIG. 3B. Cross sectionals 3D and 3E shown at the bottoms of each of FIGS. 3A and 3B respectively reveal that the inner diameter of braid sleeve 32 is initially greater than any portion of blade assembly 30. A first end 38 of braid sleeve 32 is then pulled away from a second end 40 of the braid sleeve 32. This causes braid sleeve 32 to radially constrict onto the core assembly so that the braid sleeve substantially conforms to the external surfaces of assembly 30, as can be seen in FIG. 3C. FIG. 3F, which is a cross sectional of FIG. 3C shows that a first cross sectional profile 42 of braid sleeve 32 conforms to the outer surfaces at hub 12 of assembly 30 whereas a second cross sectional profile 44 of braid sleeve 32 shows it conforming to the outer surfaces near blade tip 36.

Once the braid sleeve is stretched as shown in FIG. 3C, excess braid sleeve materials extending beyond blade tips 34 and 36 are trimmed off to leave only a small amount of overage (as can be seen in FIG. 4). Additionally, extra braid materials extending out from the leading and/or trailing edges of the propeller are also trimmed. Next, the cut edges of braid sleeve 32 may be stitched with thread and cinched to bring the braid tight against the propeller surfaces. Alternatively, or additionally, the braid is tackified (e.g., tacked down using a loose holding adhesive), a process which will be known to those skilled in the art. Thus, braid sleeve 32 is held on the external surfaces of core assembly 30, preparing it for the resin transfer molding (RTM) process.

It should be noted that additional braid materials or layers may be applied similarly onto the propeller core structures. For example, it may be advantageous to use a thicker braid material on the blades near the hub, and lighter materials towards the blade tips. Thus, different longitudinal zones of the propeller may be handled using separate kinds of braid material.

Additionally, cloth materials or mesh may be interleaved to enhance strength or provide other functions. One other function might be using a conductive material to provide lightning protection.

The RTM processing involves a dry lay-up in which laid-up assembly 45 is placed into a mold (not shown), and closed inside. Once secured in the mold, epoxy is injected, saturating the braid sleeve and completely filling the mold around the core assembly. The contents of the mold are then cured at elevated temperatures for a period of time. Once the part has completely cured, the cured one-piece propeller is then removed, deflashed, and inspected for defects. As shown in FIG. 5, a finished composite propeller product 46 will have a continuous composite skin, and is exceptionally light weight. After inspection, bolt holes are drilled through hub core 12 so that the device is able to be mounted on the drive mechanisms of an aircraft.

In some embodiments, the leading edges of the propeller may be protected by guard strips comprised of Nickel or Stainless Steel. These strips can be deposed using electroplating processes or formed from sheet metal.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of making a propeller, said method comprising:
  providing an already-cured composite propeller-shaped core, comprising:
    providing an as-cured hub portion;
    providing as-cured first and second blade portions; and
    adhering the first and second blade portions to the hub portion to form the already-cured composite propeller shaped core;
  introducing an uncured epoxy around the already-cured composite propeller-shaped core such that the core is at least partially encapsulated in the uncured epoxy; and
  administering elevated temperatures to the uncured epoxy such that a substantially continuous covering is formed at a location where the propeller-shaped core transitions from the hub portion to one of the first blade portion or the second blade portion.

2. The method of claim 1 comprising: constructing said hub portion of the same material said first and second blade portions are constructed of.

3. The method of claim 2 comprising: constructing said hub portion of a first material which is more capable of withstanding compressive forces than is a second material used to construct said first and second blade portions.

4. The method of claim 3 comprising: selecting a polyurethane as said second material.

5. The method of claim 4 comprising: selecting an epoxy-based composite material as said first material.

6. The method of claim 1, further comprising: enclosing said propeller-shaped core in a fibrous braid material before introducing the uncured epoxy.

7. The method of claim 1 wherein said administering step further comprises:
elevating temperature as a part of a resin-transfer-molding (RTM) process.

8. The method of claim 1 comprising: substantially immersing the already-cured composite propeller-shaped core in the uncured epoxy in the introducing step such that when the substantially continuous covering is formed in the administering step, the covering substantially encapsulates the core forming a single-piece propeller.

9. A method of fabricating a propeller, the method comprising:
providing a propeller-shaped foam core including a hub portion, a first blade portion and a second blade portion;
covering at least part of the foam core in a fibrous braid material by receiving the foam core within a sleeve of the fibrous braid material such that the fibrous braid covers the hub portion and at least a portion of each of the first and second blades;
placing the foam core in a mold;
saturating the fibrous braid material with uncured epoxy in the mold; and
curing the epoxy about the foam core to form a covering for the propeller.

10. The method of claim 9 comprising: forming the propeller-shaped foam core from separate first and second blade portions which are adhered about the hub portion.

11. The method of claim 9 comprising: drilling holes through the hub portion of the propeller to enable attachment to an aircraft.

12. The method of claim 9 comprising: covering and tacking the propeller-shaped foam core in the fibrous braid material before the saturating step.

13. The method of claim 12, wherein an inner diameter of the fibrous braid material is greater than an inner diameter of any portion of the plurality of blade portions during said covering and wherein covering the propeller-shaped foam core in the fibrous braid material further comprises pulling opposing ends of the fibrous braid material from one another such that the fibrous braid material radially constricts onto the propeller-shaped foam core and substantially conforms to the external surface of at least a portion of the propeller-shaped foam core.

* * * * *